March 12, 1946. G. W. KELLY 2,396,576
LUNETTE
Filed Dec. 24, 1943 2 Sheets-Sheet 1
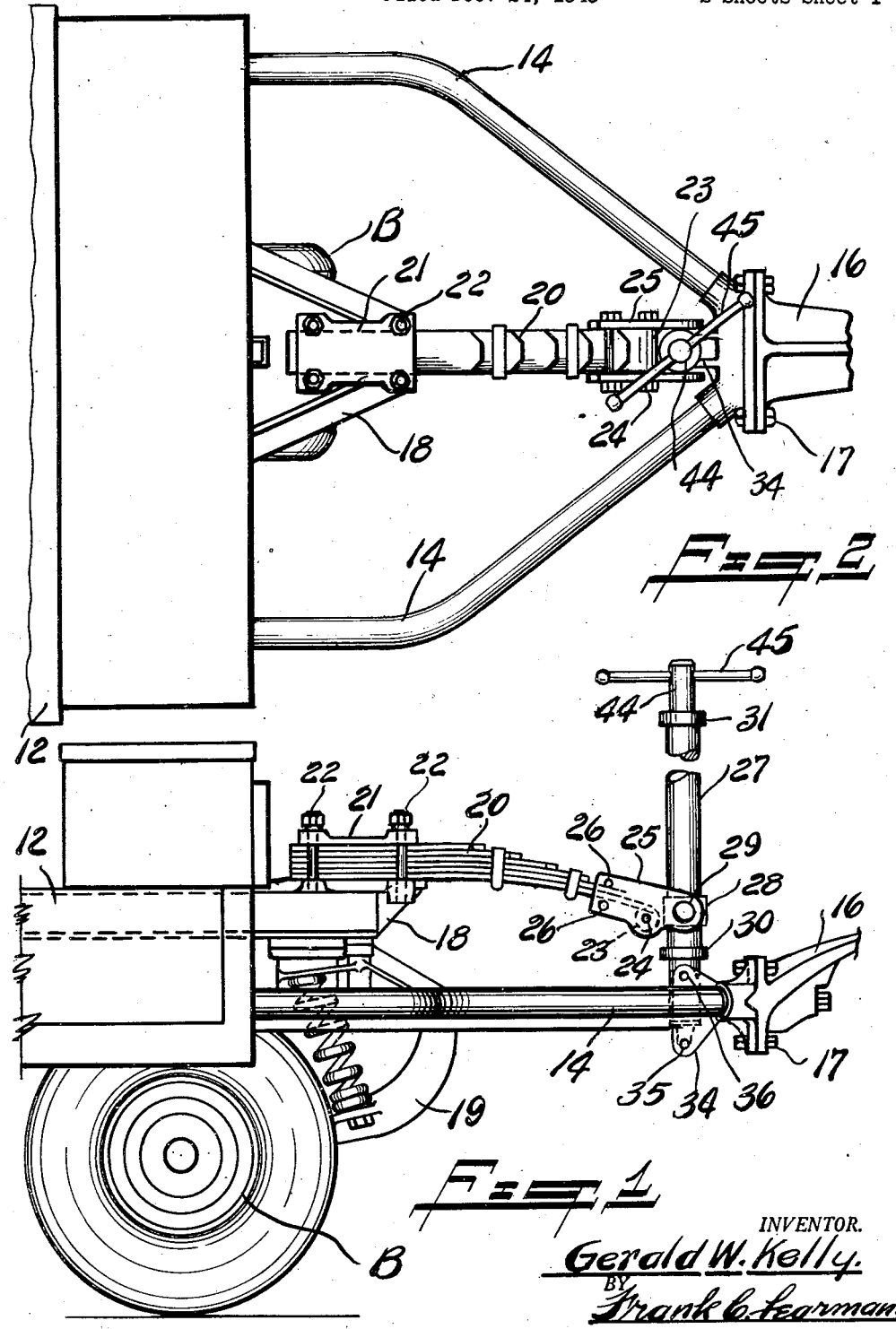
INVENTOR.
Gerald W. Kelly.
BY
Frank C. Fearman.
Attorney March 12, 1946.  G. W. KELLY  2,396,576
LUNETTE
Filed Dec. 24, 1943   2 Sheets-Sheet 2
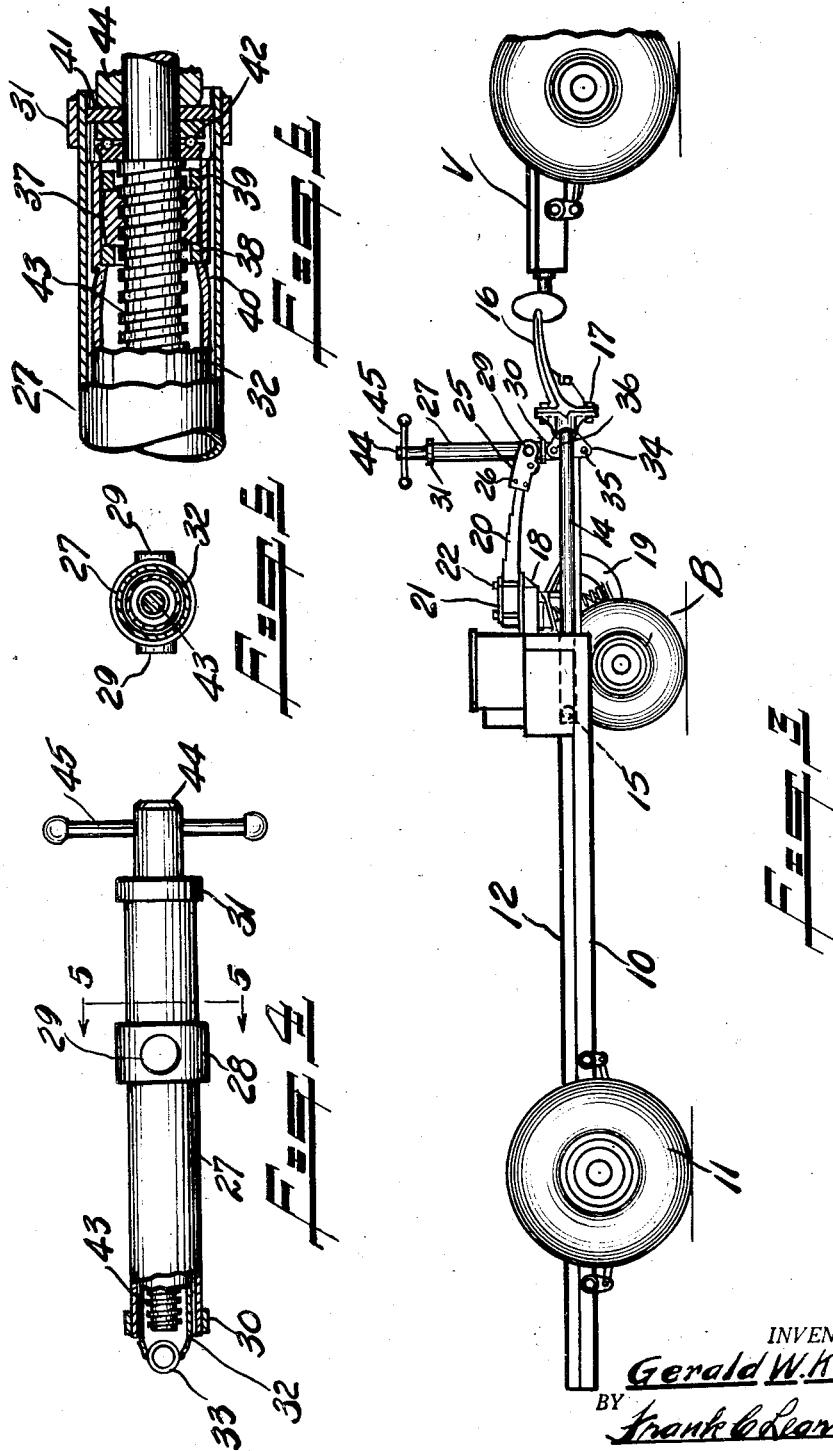
INVENTOR.
Gerald W. Kelly.
BY Frank C. Learman.
Attorney.

Patented Mar. 12, 1946

2,396,576

UNITED STATES PATENT OFFICE 2,396,576

LUNETTE

Gerald W. Kelly, Saginaw, Mich., assignor to Saginaw Products Corporation, Saginaw, Mich., a corporation of Michigan Application December 24, 1943, Serial No. 515,589

6 Claims. (Cl. 280—33.44)

This invention relates to lunettes and especially to an adjustable lunette for use in connection with the hitch arm of a trailer or other mobile vehicle.

One of the prime objects of the invention is to design an adjustable lunette of the character described and by means of which any portion of the load of the front end of a drawn vehicle may be transferred to and carried by the hitch arm or the power vehicle to which the drawn vehicle is attached.

Another object of the invention is to design a lunette so connected and arranged that it can be readily adjusted to limit the vertical movement of the front end of the trailing vehicle to which it is attached, or to operate as a jack for lifting the front end of said trailing vehicle out of holes, clear of the roadway, or so that the drawn or trailing vehicle can be operated as a two wheeled trailer, with the entire front end of the trailing vehicle imposed and supported on the power vehicle.

A further object is to design a simple, practical and substantial means which can be easily and quickly adjusted to regulate the hitch load imposed on the power vehicle, and which freely accommodates itself to uneven road conditions or obstacles without binding or undue strains.

A still further object is to provide easily operable, adjustable means composed of few parts which can be readily manufactured and assembled, and which can be readily mounted and connected.

Still a further object is to provide an adjustable lunette by means of which the outer end of the hitch arm can be easily aligned with the attaching means on the power vehicle, thus simplifying and facilitating the coupling and/or uncoupling operation.

Further objects and advantages of the invention will become apparent as the following description proceeds and the features of novelty which characterize the invention are pointed out with particularity in the claims annexed and forming a part of this specification.

For a better understanding of the invention, reference may be had to the accompanying drawings in which:

Fig. 1 is a fragmentary side elevational view of a trailer equipped with my adjustable lunette.

Fig. 2 is a top plan view thereof.

Fig. 3 is a side elevational view showing the trailer unit coupled to a power vehicle.

Fig. 4 is an enlarged, part sectional, detail illustrating the adjustable sleeve.

Fig. 5 is a transverse sectional view taken on the line 5—5 of Fig. 4.

Fig. 6 is an enlarged fragmentary sectional detail of the sleeve.

The design shown in the accompanying drawings is similar to that shown in a co-pending application filed August 30, 1943, Serial No. 500,730, Gerald W. Kelly and John F. Sloan, inventors, excepting that resilient arm is rigidly attached to the frame and the adjusting means is attached to the outer end of the hitch arm.

Referring now more particularly to the drawings in which is shown one embodiment of my invention, the numeral 10 indicates a trailer frame, the rear end of which is supported on ground engaging wheels 11, and a body 12 is mounted on said frame in the usual manner. A hitch arm 14 is hingedly connected to the main frame at the point 15 and is shown spaced rearwardly from the front of the trailer frame, although it can be attached at any desired point, and a pintle hitch 16 is detachably secured to the hitch arm 14 by means of bolts 17 as usual, and to facilitate connection of the hitch arm to a power vehicle V.

The trailer frame 10 is provided with a forwardly projecting extension 18 and the front end of the frame is supported on a self-aligning wheel assembly B, this assembly including a fork 19, the upper end of which is pivotally mounted in a bearing (not shown), that forms a part of the assembly, this wheel assembly being substantially of the same general design shown and described in patents to Pribil 2,087,299 dated July 20, 1937, and Mulholland 2,271,384 dated January 27, 1942, and while in the present instance I have shown a dual wheel assembly, it will be obvious that it can be either a dual or single wheel assembly as desired.

A resilient arm 20 is mounted on the frame extension 18, and an upper plate 21 is placed on the inner end of the arm, said arm being secured in position by means of bolts 22, and this arm is preferably in the form of a leaf spring, the outer end of which is formed with an eye 23 adapted to receive the transversely disposed bolt 24 which is mounted in the side plates 25, and transversely disposed bolts 26 are provided in said plates at points spaced rearwardly from the bolt 24, and serve to further position the plates with relation to the arm.

The adjusting means comprises a preferably tubular shell 27, and a floating hitch yoke 28 is mounted for vertical sliding movement thereon, laterally projecting pintles 29 being provided on said yoke, and to which the side plates 25 are pivotally connected. Stops 30 and 31 respectively are provided on the tubular member 27, these stops limiting the vertical travel or movement of the hitch yoke 28.

The adjusting means is formed as clearly shown in detail in Figs. 4, 5 and 6 of the drawings, an inner sleeve 32 being adjustably mounted in the shell 27, the lower end terminating in a ring 33 for attachment to the hitch arm plates 34 by means of the bolt 35, a similar opening 36 being provided in hinge plates 34 to provide for couplers of various heights.

An internally threaded nut 37 is mounted in the upper end of the sleeve 32 and is held in position by means of plate members 38 and 39 which are fitted and welded in said sleeve, indents 40 being provided in the sleeve and form a seat for the plate 38.

A plate 41 is welded in and forms a closure for the upper end of the shell 27 and a bearing 42 is interposed between the members 39 and 41. An adjusting screw 43 extends into said inner sleeve 32 and has threaded engagement with the nut 37, a hub 44 being provided on the upper end of said screw, and a transversely disposed handle 45 is mounted in said hub to facilitate manipulation of the screw to vertically adjust the inner sleeve 32 with relation to the outer shell 27 to compensate for variations in height of the couplers of the power vehicles, this adjustment in no manner affecting the movement of the yoke 28.

The range of movement of the yoke 28 is governed by the spacing of stops, and this can be varied to suit individual requirements.

What I claim is:

1. A trailer vehicle of the character described, including a wheeled frame adapted to be connected to a power vehicle, a hitch arm hingedly connected to said frame, a vertically disposed post connected to the forward end of the hitch arm, means for vertically adjusting said post and a resilient arm rigid on said frame with its free end overhanging said hitch arm and slidably connected to said vertically adjustable post.

2. A trailer vehicle of the class described comprising a mobile frame adapted to be connected to a power vehicle, a hitch arm hingedly connected to said frame, a vertically disposed post connected to the outer end of the hitch arm, means for extending said post, a resilient arm rigid on said frame with its free end slidably connected to said post, and stops for limiting the sliding movement of the outer end of said resilient arm.

3. A trailer vehicle comprising a mobile frame adapted to be connected to and drawn by a power vehicle, a hitch arm hingedly connected to said frame, vertically disposed extensible means mounted on the outer end of the hitch arm, a yoke mounted for vertical travel thereon, and a forwardly projecting resilient arm mounted on said frame with its free end pivotally connected to said yoke for limited sliding movement thereon.

4. A trailer vehicle comprising a wheeled frame adapted to be connected to a prime mover, a hitch arm connected to the frame, vertically disposed extensible means pivotally connected to the forward end of the hitch arm; manually operable means for adjusting said extensible means, a hitch yoke mounted to slide thereon, stops for limiting the sliding movement of the hitch yoke, and a forwardly projecting resilient arm having its one end mounted on the frame with the opposite end pivotally connected to said yoke.

5. The combination with a power vehicle, of a trailer vehicle attached to and drawn thereby and comprising a mobile frame, a hitch arm hingedly connected thereto, a load adjusting means pivotally mounted on the outer end of the hitch arm and comprising inner and outer sleeves adjustable with relation to each other, a yoke slidable on the outer sleeve, a forwardly projecting resilient arm mounted on the trailer frame with its free end pivotally connected to said yoke, and stops for limiting the travel of said yoke.

6. A trailer vehicle comprising a mobile frame adapted to be connected to and drawn by a power vehicle, a hitch arm hingedly connected to said frame, adjustable means mounted on the outer end of the hitch arm and including individual sleeves adjustable with relation to each other, a yoke mounted for vertical travel thereon, and a forwardly projecting resilient arm mounted on said frame with its free end pivotally connected to said yoke.

GERALD W. KELLY.